US008823794B2

(12) United States Patent
Waring et al.

(10) Patent No.: US 8,823,794 B2
(45) Date of Patent: Sep. 2, 2014

(54) MEASURING DEVICE USER EXPERIENCE THROUGH DISPLAY OUTPUTS

(75) Inventors: Damon R. Waring, Lexington, MA (US); Keith L. Kao, Los Altos, CA (US); Albert Kwok, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 315 days.

(21) Appl. No.: 13/174,052

(22) Filed: Jun. 30, 2011

(65) Prior Publication Data

US 2013/0002862 A1 Jan. 3, 2013

(51) Int. Cl.
*H04N 7/18* (2006.01)
*G11B 31/00* (2006.01)
(52) U.S. Cl.
CPC . *H04N 7/18* (2013.01); *G11B 31/00* (2013.01)
USPC .......................................................... 348/143
(58) Field of Classification Search
CPC .......................................................... H04N 7/18
USPC .................................................... 348/30–161
See application file for complete search history.

(56) References Cited

U.S. PATENT DOCUMENTS

| 5,566,291 | A | * | 10/1996 | Boulton et al. | 715/709 |
|---|---|---|---|---|---|
| 7,167,197 | B2 | * | 1/2007 | Hill et al. | 348/130 |
| 7,479,949 | B2 | * | 1/2009 | Jobs et al. | 345/173 |
| 2007/0176871 | A1 | | 8/2007 | Tsai et al. | |
| 2008/0091121 | A1 | * | 4/2008 | Sun et al. | 600/587 |
| 2009/0312009 | A1 | * | 12/2009 | Fishel | 455/425 |
| 2010/0070542 | A1 | * | 3/2010 | Feinsmith | 707/812 |
| 2010/0121866 | A1 | * | 5/2010 | Bell et al. | 707/758 |
| 2011/0292288 | A1 | | 12/2011 | Deever | |
| 2012/0146956 | A1 | * | 6/2012 | Jenkinson | 345/178 |
| 2012/0188176 | A1 | * | 7/2012 | Uzelac et al. | 345/173 |
| 2012/0280934 | A1 | * | 11/2012 | Ha et al. | 345/174 |

FOREIGN PATENT DOCUMENTS

| JP | 2002-291001 A | 10/2002 |
|---|---|---|
| KR | 10-2006-0104722 A | 10/2006 |
| KR | 10-2006-0121330 A | 11/2006 |
| KR | 1020110077536 A | 7/2011 |
| WO | 2011/161316 A1 | 12/2011 |
| WO | 2013/003534 A2 | 1/2013 |
| WO | 2013/122586 A2 | 8/2013 |

OTHER PUBLICATIONS

International Search Report and Written Opinion received for PCT application No. PCT/US2012/044537, mailed on Dec. 18, 2012, 10 pages.
International Search Report and Written Opinion received for PCT Patent Application No. PCT/US2012/025282 mailed on Aug. 23, 2013, 8 pages.
International Preliminary Report on Patentability and Written Opinion received for PCT Patent Application No. PCT/US2012/044537, mailed on Jan. 16, 2014, 7 pages.

* cited by examiner

*Primary Examiner* — Joseph Ustaris
*Assistant Examiner* — Talha Nawaz
(74) *Attorney, Agent, or Firm* — Jordan IP Law, LLC

(57) ABSTRACT

Methods and systems may include high speed camera to capture a video of a display output, a robotic arm to interact with a device, a processor, and a computer readable storage medium having a set of instructions. If executed by the processor, the instructions cause the system to identify one or more user experience characteristics based on the captured video, and generate a report based on the one or more user experience characteristics. The report may include a perceptional model score that is generated based on the user experience characteristics as well as other parameters. The user experience characteristics could include response time, frame rate and run time characteristics.

14 Claims, 2 Drawing Sheets

MEASURING DEVICE USER EXPERIENCE THROUGH DISPLAY OUTPUTS

BACKGROUND

1. Technical Field

Embodiments generally relate to the evaluation of consumer electronics devices. More particularly, embodiments relate to measuring device user experience characteristics through the display outputs of the device.

2. Discussion

Conventional approaches to evaluating the effectiveness of consumer electronic devices may involve either conducting consumer surveys or executing software tools on the device to obtain benchmarking data. While such techniques may be suitable under certain circumstances, there remains considerable room for improvement. For example, consumer surveys may be subjective and/or unreliable. Moreover, traditional software tools can require installation of the tools on the device in question and may be unable to capture data from the user's perspective.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Embodiments may include a system having a camera to capture a video of a display output. The system can also include a processor and a computer readable storage medium having a set of instructions which, if executed by the processor, cause the system to identify one or more user experience characteristics based on the video. The instructions may also cause the system to generate a report based on the one or more user experience characteristics.

Embodiments may also provide for a method in which a video is captured of a display output, and one or more user experience characteristics are identified based on the video. In addition, the method can involve generating a report based on the one or more user experience characteristics.

Other embodiments can include a computer readable storage medium having a set of instructions which, if executed by a processor, cause a computer to identify one or more user experience characteristics based on a video of a display output. The instructions may also cause a computer to generate a report based on the one or more user experience characteristics.

Figure 1:
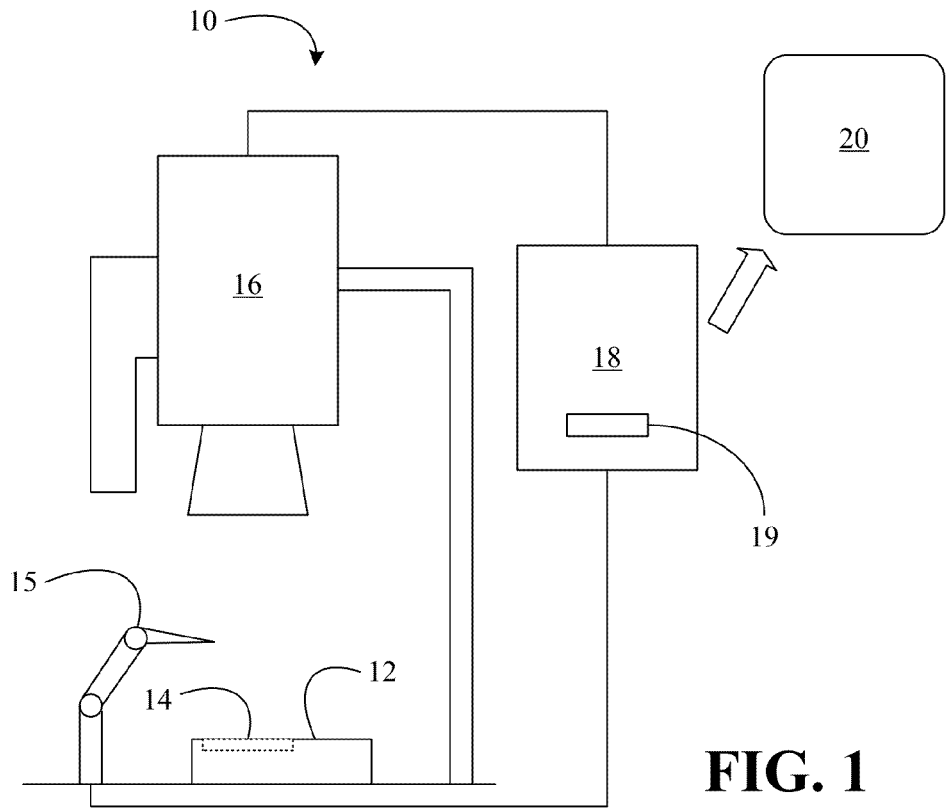
FIG. 1 is a block diagram of an example of a measurement system according to an embodiment.

FIG. 1 shows a measurement system 10 that may be used to evaluate a device 12 having a display 14, wherein the device 12 could be a consumer electronics device such as a wireless smart phone, mobile Internet device (MID), tablet, notebook computer, desktop computer, television, etc. Thus, the device 12 might be used to browse web pages, play video games, view programming content, and conduct other user related activities. The display 14 could be an LCD (liquid crystal display), LED (light emitting diode) display, plasma display, touch screen, etc. In the case of a touch screen, the display 14 might be used to input data and control the functionality of the device 12, as well as to output information to the user of the device 12. The device 12 may also have other input devices (not shown) such as a mouse, touchpad, keypad, keyboard, and/or microphone.

In the illustrated example, a camera 16 captures a video of the display 14 output. The camera 16 could be a digital camera capable of recording the display 14 output at high enough frame rates and resolutions to extract objective data from the resulting video. For example, a touch interaction, such as a zoom, pan, rotate or tap operation, could be performed on the device 12 via the display 14 or other input device, wherein the video captured by the camera 16 may document the resulting output of the display 14. In one example, the user interaction is mimicked by a robotic arm 15. Alternatively, the user interaction may be conducted manually. The illustrated system 10 also includes a computing platform 18 having logic 19 to identify one or more user experience characteristics based on the captured video, and generate various reports 20 based on the identified user experience characteristics.

In the case of a user interaction-based analysis, the logic 19 may also be configured to instruct the robotic arm 15 to mimic (e.g., approximate) the user interaction in question. For example, the computing platform 18 could maintain a coordinate mapping of the locations of items (e.g., desktop icons) on the display 14. In such an example, the logic 19 might instruct the robotic arm 15 to open a browser by clicking at point x,y on the display 14. Moreover, the coordinate mappings may be maintained for different devices such that the robotic arm 15 would be instructed to click at point A,B for the same browser icon on another device. In addition, the logic 19 may control the recording activity of the camera 10 as well as the collection of data.

The user experience characteristics might include response time, wherein the response time could be defined as the amount of time between a user input/interaction with the device 14 (e.g., finger swipe on a touch screen) and the requested action being presented on the display 14 (e.g., scene pan from left to right). Other user experience characteristics might include, but are not limited to, screen dots per inch (DPI), resolution, temporal and spatial alignment, frame rate, run time (e.g., time between beginning and finishing an animation/output sequence), and quality (e.g., tearing during video playback) characteristics. In one example, the reports 20 include one or more perceptual model scores (e.g., rating from 1-5) that are a function of characteristics extracted from the captured video as well as other parameters/characteristics. Indeed, the perceptual model may take into consideration inputs including, but not limited to, smoothness, responsiveness, temporal and spatial alignment, display resolution, display settings, content quality, display quality, elapsed time, ease of connectivity, ease of use, thermal comfort, audio/video (A/V) sync, audio quality, etc.

Figure 2:
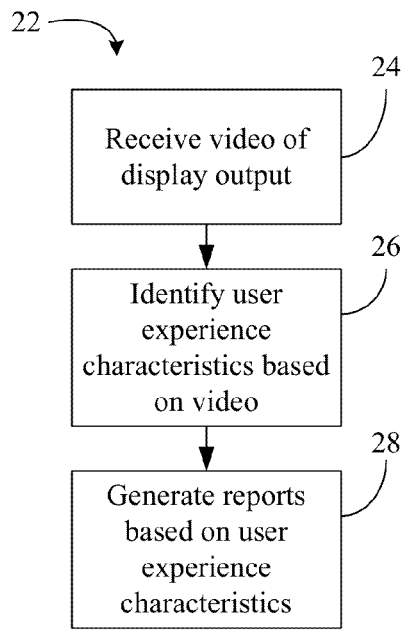
FIG. 2 is a flowchart of an example of a method of evaluating a device according to an embodiment.

Turning now to FIG. 2, a method 22 of evaluating a device is shown. The method 22 may be implemented in executable software as a set of logic instructions stored in a machine- or computer-readable medium of a memory such as random access memory (RAM), read only memory (ROM), programmable ROM (PROM), firmware, flash memory, etc., in fixed-functionality hardware logic using circuit technology such as application specific integrated circuit (ASIC), complementary metal oxide semiconductor (CMOS) or transistor-transistor logic (TTL) technology, or any combination thereof. For example, computer program code to carry out operations shown in method 22 may be written in any combination of one or more programming languages, including an object oriented programming language such as Java, Smalltalk, C++ or the like and conventional procedural programming languages, such as the "C" programming language or similar programming languages. The functionality of method 22 may also be implemented via proprietary and/or commercially available image/video processing tools such as OpenCV or Matlab.

Processing block 24 provides for receiving a video of a display output. As already noted, the display could be associated with a wide variety of devices such as a smart phone, mobile Internet device (MID), personal digital assistant (PDA), tablet, notebook computer, desktop computer, television, etc. One or more user experience characteristics may be identified at block 26 based on the video, wherein the user experience characteristics can reflect and/or measure the operation of the underlying device from the user's perspective. For example, a frame-by-frame comparison of the video content might be conducted in order to identify the user experience characteristics. Thus, the response time of the device, for example, can be ascertained as the user would perceive it (e.g., externally from the device) rather than from the perspective of a software tool executing on the device itself (e.g., internal to the device). Similarly, the frame rate can be determined from the video of the device output, rather than from an internal measurement made by software installed on the device. Accordingly, the illustrated approach enables the extraction of valuable objective information from the most meaningful perspective (i.e., the user's perspective) in a consumer electronics setting. Illustrated block 28 generates one or more reports based on the identified user experience characteristics. As already noted, the reports may include perceptual model scores.

Figure 3A:
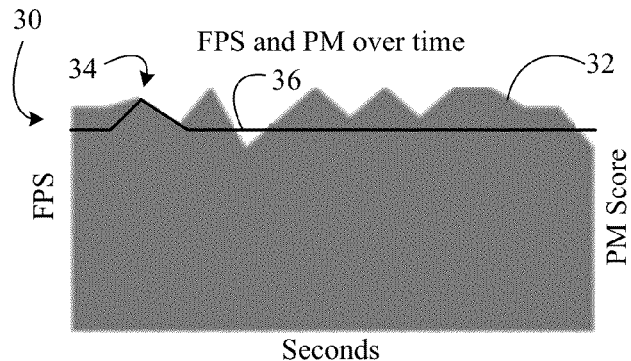
FIGS. 3A and 3B are charts of examples of user experience reports according to an embodiment.
Figure 3B:
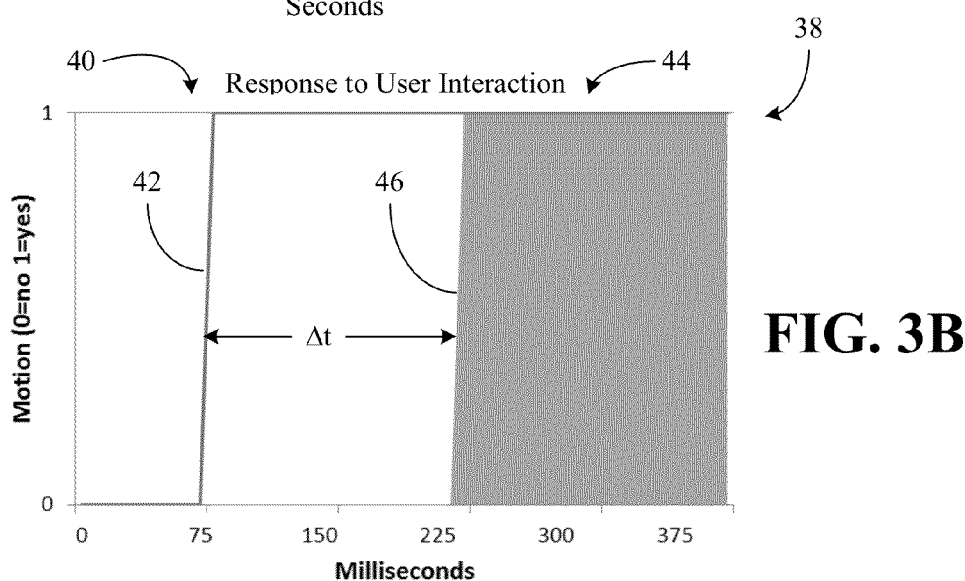

FIGS. 3A and 3B show examples of reports that might be generated using the techniques described herein. In particular, FIG. 3A shows an automatically generated chart 30 of frames per second (FPS) and perceptual model (PM) score over time. In general, the PM score can be obtained from chronological (e.g., time based) data that ranks the operation of the device as a function of a wide variety of characteristics such as smoothness, responsiveness, temporal and spatial alignment, display resolution, display settings, content quality, display quality, elapsed time, ease of connectivity, ease of use, thermal comfort, A/V sync, audio quality, on a scale from one to five. In the illustrated example, an FPS plot 32 exhibits a variability that has a common peak region 34 with PM score plot 36. Thus, by comparing the user experience characteristic reflected in the FPS plot 32 with the chronological data reflected in the PM score plot 36, the illustrated report 30 is able to identify operational areas of interest and can therefore convey a substantial amount of information without requiring the installation of special software on the device being evaluated. For example, it might be determined that the heightened FPS value at common peak region 34 is at least in part responsible for the higher PM score.

FIG. 3B shows an automatically generated chart 38 of responsiveness to user interaction for a touch screen. In the illustrated example, a region 40 of the chart 38 demonstrates that a finger comes into contact with the touch screen at a first instance 42. Another region 44 of the chart demonstrates that the requested content begins to appear on the touch screen at a second instance 46. The difference between the first instance 42 and the second instance 46 can be measured in frames ($\Delta f$), which can be converted into time ($\Delta t$), and may objectively represent the responsiveness of the device under test. Other reports such as smoothness reports (e.g., based on frame rate variability) may also be generated based on the user experience characteristics identified in the video of the display output.

Figure 4:
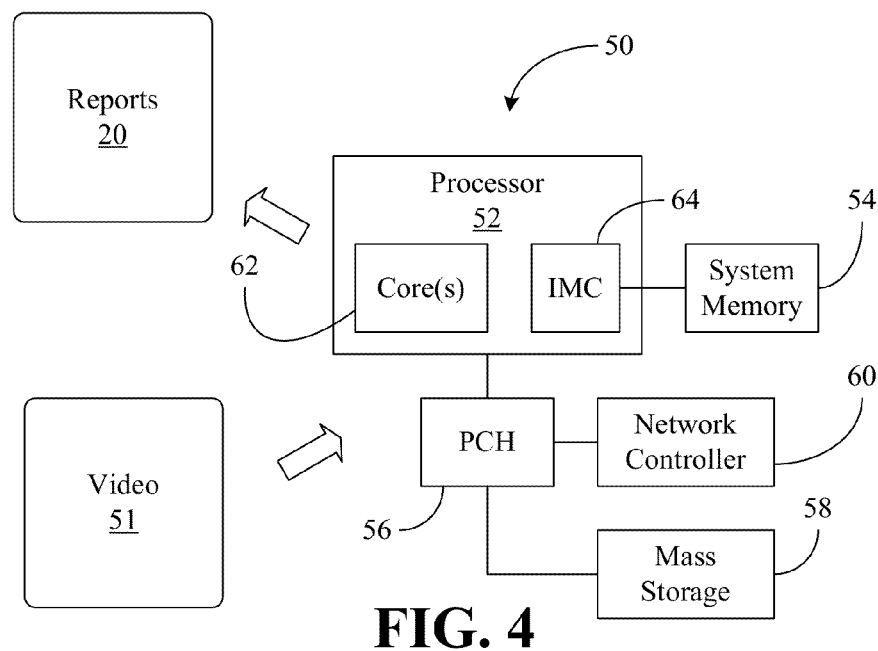
FIG. 4 is a block diagram of an example of a computing platform according to an embodiment.

FIG. 4 shows a computing platform 50 having a processor 52, system memory 54, a platform controller hub (PCH) 56, mass storage (e.g., hard disk drive/HDD, optical disk, flash memory) 58, a network controller 60, and various other controllers (not shown). The computing platform 50 could be readily substituted for the computing platform 18 (FIG. 1), already discussed. The platform 50 could be part of a mobile platform such as a laptop, personal digital assistant (PDA), mobile Internet device (MID), wireless smart phone, etc., or any combination thereof. In addition, the platform 50 may also be part of a fixed platform such as a personal computer (PC), server, workstation, etc. Thus, the processor 52 may include one or more processor cores 62 capable of executing a set of stored logic instructions, and an integrated memory controller (IMC) 64 configured to communicate with the system memory 54. The system memory 54 could include dynamic random access memory (DRAM) configured as a memory module such as a dual inline memory module (DIMM), a small outline DIMM (SODIMM), etc.

The illustrated PCH 56, sometimes referred to as a Southbridge of a chipset, functions as a host device and may communicate with the network controller 60, which could provide off-platform wireless communication functionality for a wide variety of purposes such as cellular telephone (e.g., W-CDMA (UMTS), CDMA2000 (IS-856/IS-2000), etc.), WiFi (e.g., IEEE 802.11, 1999 Edition, LAN/MAN Wireless LANS), Low-Rate Wireless PAN (e.g., IEEE 802.15.4-2006, LR-WPAN), Bluetooth (e.g., IEEE 802.15.1-2005, Wireless Personal Area Networks), WiMax (e.g., IEEE 802.16-2004, LAN/MAN Broadband Wireless LANS), Global Positioning System (GPS), spread spectrum (e.g., 900 MHz), and other radio frequency (RF) telephony purposes. The network controller 60 could also provide off-platform wired communication (e.g., RS-232 (Electronic Industries Alliance/EIA), Ethernet (e.g., IEEE 802.3-2005, LAN/MAN CSMA/CD Access Method), power line communication (e.g., X10, IEEE P1675), USB (e.g., Universal Serial Bus 2.0 Specification), digital subscriber line (DSL), cable modem, Ti connection), etc., functionality.

The PCH 56 may also be coupled to a robotic arm 15 (FIG. 1) in order to facilitate the approximation of various user interactions. In such a case, the processor 52 might instruct the robotic arm 15 (FIG. 1) to conduct various touch operations including, but not limited to, zoom, pan, rotate and/or tap operations on the display or other input component of the device.

In the illustrated example, the camera 16 (FIG. 1) captures a video 51 of a display output and provides the video 51 to the processor 52 via the PCH 56 for further analysis. For example, the video 51 may be stored to a memory card of the camera 16 (FIG. 1) and transferred to the computing platform 50 via mass storage 58. Other approaches to transferring the video 51 may also be used. Indeed, the video 51 of the display output could be obtained via the network controller 60. The processor 52 may execute logic that identifies one or more user experience characteristics based on the video, and generates one or more reports based on the user experience characteristics, as already discussed.

Thus, the techniques described herein can be used to evaluate the user experience for any device with a display and do not require low level access to the software of the device under test. The techniques may also be independent of the operating system (OS) running on the device and can have broad applicability to a wide variety of consumer electronics devices. Moreover, the data obtained may help differentiate one product from another on the basis of its platform experience in an automated fashion. In addition, the techniques can enable measurement of previously difficult to quantify aspects of user experience including, but not limited to, quality, response time to interactions such as zooming and panning, and smoothness of interactions and animations.

Embodiments of the present invention are applicable for use with all types of semiconductor integrated circuit ("IC") chips. Examples of these IC chips include but are not limited to processors, controllers, chipset components, programmable logic arrays (PLAs), memory chips, network chips, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. might be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A system comprising:
a camera to capture a video of a display output of a device;
a processor; and
a computer readable storage medium including a set of instructions which if executed by the processor, cause the system to,
identify one or more user experience characteristics based on the video, wherein the user experience characteristics reflect and/or measure operation of the device from a perspective of the user;
generate a report based on the one or more user experience characteristics; and compare chronological data to the one or more user experience characteristics of the video to generate a perceptual model score, wherein the perceptual model score is a rating that is a function of characteristics extracted from the captured video including one or more of: smoothness, responsiveness, temporal and spatial alignment, display resolution, display settings, content quality, display quality, elapsed time, ease of connectivity, ease of use, thermal comfort, audio/video sync, and audio quality.

2. The system of claim 1, wherein the instructions, if executed, cause the system to identify at least one of a response time characteristic, a frame rate characteristic, a run time characteristic and a quality characteristic.

3. The system of claim 2, further including a robotic arm, wherein the instructions, if executed, cause the system to:
instruct the robotic arm to mimic a user interaction and
identify the response time characteristic with respect to the user interaction.

4. The system of claim 3, wherein the user interaction is to include at least one of a touch screen operation, a mouse operation, a touchpad operation, a keypad operation, a keyboard operation and a microphone operation.

5. The system of claim 3, wherein the user interaction is to include a touch interaction.

6. A method comprising:
a camera to capture a video of a display output of a device;
identifying one or more user experience characteristics based on the video, wherein the user experience characteristics reflect and/or measure operation of the device from a perspective of the user;
generating a report based on the one or more user experience characteristics; and generating a perceptual model score by comparing chronological data to the one or more user experience characteristics of the video, wherein the perceptual model score is a rating that is a function of characteristics extracted from the captured video including one or more of: smoothness, responsiveness, temporal and spatial alignment, display resolution, display settings, content quality, display quality, elapsed time, ease of connectivity, ease of use, thermal comfort, audio/video sync, and audio quality.

7. The method of claim 6, wherein identifying the one or more user experience characteristics includes identifying at least one of a response time characteristic, a frame rate characteristic, a run time characteristic and a quality characteristic.

8. The method of claim 7, wherein the response time characteristic is identified with respect to a user interaction.

9. The method of claim 8, wherein the user interaction includes a touch interaction.

10. The method of claim 8, wherein the user interaction includes at least one of a zoom operation, a tap operation, a rotate operation and a pan operation.

11. A non-transitory computer readable storage medium comprising a set of instructions which if executed by the processor, cause a computer to:
   identify one or more user experience characteristics based on a video of a display output of a device, wherein the user experience characteristics reflect and/or measure operation of the device from a perspective of the user;
   generate a report based on the one or more user experience characteristics; and compare chronological data to the one or more user experience characteristics of the video to generate a perceptual model score, wherein the perceptual model score is a rating that is a function of characteristics extracted from the captured video including one or more of: smoothness, responsiveness, temporal and spatial alignment, display resolution, display settings, content quality, display quality, elapsed time, ease of connectivity, ease of use, thermal comfort, audio/video sync, and audio quality.

12. The medium of claim 11, wherein the instructions, if executed, cause a computer to identify at least one of a response time characteristic, a frame rate characteristic, a run time characteristic and a quality characteristic.

13. The medium of claim 12, wherein the instructions, if executed, cause a computer to identify the response time characteristic with respect to a user interaction.

14. The medium of claim 13, wherein the user interaction is to include at least one of a touch screen operation, a mouse operation, a touchpad operation, a keypad operation, a keyboard operation, a microphone operation, and a touch interaction.

* * * * *